United States Patent
Reul et al.

(10) Patent No.: US 7,644,647 B2
(45) Date of Patent: Jan. 12, 2010

(54) HYDRAULIC ACTUATING DEVICE FOR ACTUATING A SHIFT ROD IN PARTICULAR OF A GEARBOX FOR MOTOR VEHICLES

(75) Inventors: Alexander Reul, Frensdorf (DE); Roland Stössel, Oberaurach (DE); Egid Macht, München (DE)

(73) Assignee: FTE automotive GmbH, Ebern (DE)

( * ) Notice: Subject to any disclaimer, the term of this patent is extended or adjusted under 35 U.S.C. 154(b) by 279 days.

(21) Appl. No.: 11/821,911

(22) Filed: Jun. 26, 2007

(65) Prior Publication Data
US 2008/0006114 A1 Jan. 10, 2008

(30) Foreign Application Priority Data
Jun. 29, 2006 (DE) .................. 10 2006 030 450

(51) Int. Cl.
*F15B 21/04* (2006.01)
*F16J 10/04* (2006.01)

(52) U.S. Cl. ............... 92/79; 91/431; 92/112; 92/171.1

(58) Field of Classification Search ......... 92/79, 92/112, 183, 171.1; 91/431
See application file for complete search history.

(56) References Cited

U.S. PATENT DOCUMENTS 2,318,757 A 5/1943 Christenson
2,830,859 A * 4/1958 Parsons .......................... 92/79
4,798,128 A * 1/1989 Mita ........................... 92/171.1
6,719,115 B2 * 4/2004 Rogner et al. ............... 92/169.1
6,766,710 B2 7/2004 Reul et al.
2004/0226799 A1 11/2004 Bader

FOREIGN PATENT DOCUMENTS

| DE | 1 023 282 B | 1/1958 |
| DE | 1 205 390 B | 11/1965 |
| DE | 195 43 646 A 1 | 5/1997 |
| GB | 1 287 259 A | 8/1972 |

* cited by examiner

Primary Examiner—F. Daniel Lopez
(74) Attorney, Agent, or Firm—Reising Ethington P.C.

(57) ABSTRACT

There is disclosed a hydraulic actuating device for actuating a shift rod in particular of a gearbox for motor vehicles, which comprises a cylinder chamber provided in or on a gear housing for accommodating a shift piston which is actively connected to the shift rod and which divides the cylinder chamber into two working chambers which can selectively be acted upon by a pressure medium from a reservoir for the latter, said working chambers being separated from one another by means of a sealing arrangement arranged on the shift piston. The sealing arrangement is designed in a valve-like manner so that, when at least one working chamber is acted upon by pressure medium, it connects said working chamber to an auxiliary chamber which is delimited by the sealing arrangement and which in turn can be connected to the reservoir for the pressure medium. As a result, a cost-effective hydraulic actuating device is provided which is vented in a simple and efficient manner during operation from the working chambers via the auxiliary chamber to the reservoir.

19 Claims, 4 Drawing Sheets

HYDRAULIC ACTUATING DEVICE FOR ACTUATING A SHIFT ROD IN PARTICULAR OF A GEARBOX FOR MOTOR VEHICLES

TECHNICAL FIELD

The invention relates to a hydraulic actuating device for actuating a shift rod. In particular, the invention relates to a hydraulic actuating device for actuating a shift rod of a gearbox for motor vehicles, as widely used in the motor vehicle industry for example for automatic gearboxes. Such an actuating device serves for example to actuate, i.e. to displace and optionally position, a shift fork attached to a shift rod of the gear mechanism in order to bring about a gear change.

DESCRIPTION OF THE PRIOR ART

For combined shifting of a mechanical gearbox in a vehicle, the generic document DE-A-195 43 646 discloses a pneumatic or hydraulic double-acting shift mechanism which comprises a shift cylinder flanged onto a housing of the gearbox. The shift cylinder has a working chamber or cylinder chamber for accommodating a shift piston, to which a piston rod or shift rod is attached by means of a screw connection. The shift piston divides the cylinder chamber of the shift cylinder into two working chambers which can selectively be acted upon by a pressure medium from a reservoir via a respective pressure line in order to displace the shift piston and thus the shift rod. At the outer circumference of the shift piston, a sealing arrangement prevents any exchange of pressure medium between the working chambers. In order to soften or dampen the abutment stop of the shift piston in its end positions in the cylinder chamber, a slide which is essentially I-shaped in side view is arranged in a bore of the shift piston, which slide briefly opens a through-channel in the shift piston shortly before said shift piston reaches its respective end position so as to establish a connection between the two working chambers, but otherwise interrupts this connection, i.e. in the end positions of the shift piston and in the other intermediate positions thereof. The slide thus gives rise to a "pressure flow" between the working chambers shortly before the shift piston reaches its respective end position, which leads to a slowing-down of the movement of the shift piston and thus to a gentler softer abutment of the shift piston in its end position.

Such shift mechanisms are also used in particular to push or pull the shift rod axially into one of three different predetermined positions, namely two end positions and one center position lying therebetween. The actuating travels and positions are in this case detected on the shift rod by means of an electrical measuring system, wherein the detected values are used to move the shift rod into the desired position by suitably applying pressure to the shift cylinder via electrically controlled hydraulic valves, said shift cylinder acting as actuator. The shift rod is additionally mechanically retained in the predetermined working or shift position respectively reached, e.g. by means of a spring-loaded ball which snaps into an associated notch in the shift rod, wherein the mechanical retainment can be overcome by applying a greater force to the shift rod so that the shift cylinder used in this way need not itself serve as a locking or clamping cylinder which keeps the shift rod in the respective shift position but rather need only act as a hydraulic drive for the shift rod.

In the case of hydraulic operation of such a shift mechanism, there is the problem that the shift mechanism is difficult to vent on account of its position on the gear housing which makes it difficult or impossible to access, namely when the shift mechanism has to be filled with the hydraulic pressure medium and purged prior to first use or during maintenance. This is made even more difficult by the fact that often gear oil is used as the hydraulic pressure medium for such shift mechanisms, which in its main use as a lubricant and coolant for the gearbox is present in sufficient quantity in the oil sump of the gear mechanism but contains many air bubbles on account of the fact that it is constantly circulated through the rotating parts of the gear mechanism and gearwheels and as a result of the foaming associated therewith. However, if the shift mechanism is operated with such gear oil, sufficient venting of the shift cylinder is necessary so that the above three working or shift positions of the shift rod can be reached without any impairment to the functioning on account of air inclusions.

What is desirable is to provide a hydraulic actuating device for actuating a shift rod in particular of a gearbox for motor vehicles, which is designed as cost-effectively as possible and can be vented in a simple and efficient manner.

SUMMARY OF THE INVENTION

According to the invention, in a hydraulic actuating device for actuating a shift rod in particular of a gearbox for motor vehicles, which actuating device comprises a cylinder chamber provided in or on a gear housing for accommodating a shift piston which is actively connected to the shift rod and which divides the cylinder chamber into two working chambers which can selectively be acted upon by a pressure medium from a reservoir for the latter, said working chambers being separated from one another by means of a sealing arrangement arranged on the shift piston; the sealing arrangement is designed in a valve-like manner so that, when at least one working chamber is acted upon by pressure medium, it connects said working chamber to an auxiliary chamber which is delimited by the sealing arrangement and which in turn can be connected to the reservoir for the pressure medium.

As a result of this configuration of the actuating device, when at least one working chamber is acted upon by pressure medium any air located therein is entrained into the auxiliary chamber by the flow of pressure medium taking place across the sealing arrangement between said working chamber and the auxiliary chamber, from where the air can further pass with the pressure medium into the reservoir for the pressure medium. A deliberate (small) leakage thus takes place across the valve-like sealing arrangement from this working chamber which is acted upon by pressure medium to the auxiliary chamber provided for temporarily holding air, so that this working chamber which is acted upon by pressure medium can be vented in a conceivably simple manner. As a result, no air can collect in the working chambers of the actuating device, which could impair the function of the actuating device.

The reservoir for the pressure medium, for example the oil sump of the gear mechanism or—in the case of a pressure medium supply for the actuating device which is separate from the lubricant and coolant circuit for the gear mechanism—a separate reservoir into which any air contained in the actuating device is ultimately conveyed, can easily be vented or is in any case equipped with a device for continuous venting. There is thus advantageously no need for additional venting measures—e.g. conventional individual vents on the inaccessible or barely accessible cylinder chamber of each actuating device of the gearbox and/or time-consuming individual venting and purging routines at the time of first use or during maintenance of the respective actuating device.

In one advantageous embodiment, the sealing arrangement of the actuating device according to the invention may comprise two seals which are in each case arranged between one of the working chambers and the auxiliary chamber of the actuating device. In this case, the necessary valve function of the sealing arrangement can be ensured in an advantageously simple manner in that each seal has an elastic sealing lip which in the rest state of the actuating device bears against a cylinder wall of the cylinder chamber, can be flexed away from the cylinder wall in order to clear a passage for the pressure medium when the hydraulic pressure in the respective adjoining working chamber is a predetermined amount higher than the hydraulic pressure in the auxiliary chamber, and can be pressed against the cylinder wall in order to provide sealing with respect to the cylinder wall when the hydraulic pressure in the auxiliary chamber is a predetermined amount higher than the hydraulic pressure in the respective adjoining working chamber. These seals may be groove rings known per se which are mounted on the shift piston in the opposite way to their customary installed position, which is particularly cost-effective since commercially available mass-produced articles can be used.

Continuing the concept of the invention, the hydraulic connection between the auxiliary chamber of the actuating device and the reservoir may have at least one throttle point. By suitably dimensioning the throttle point, the aforementioned deliberate leakage across the sealing arrangement of the actuating device can advantageously be reduced to a minimum. However, in order to ensure permanent venting of the working chambers of the actuating device, the flow rate of the pressure medium in the auxiliary chamber must be greater than the rate at which the air inclusions or air bubbles can rise in the pressure medium in the auxiliary chamber.

In order to limit the volume of the auxiliary chamber on the shift piston, it may furthermore be provided that the shift piston has at least one essentially radially running channel with two ends, of which one end opens into the auxiliary chamber while the throttle point is provided at the other end.

In one variant of the actuating device according to the invention, in which the pressure medium supply for the actuating device is connected to the lubricant and coolant circuit of the gear mechanism, the shift piston may comprise a hollow piston shaft which surrounds the shift rod and extends into the gear housing in a manner dynamically sealed at its outer circumference, wherein at least one channel is formed between the inner circumference of the piston shaft and the shift rod, which channel hydraulically connects the auxiliary chamber to the interior of the gear housing. In this case, the channel between the piston shaft and the shift rod may in principle be formed on the outer circumference of the piston shaft. However, with regard to producing the channel in as cost-effective a manner as possible, preference is given to an embodiment in which the channel between the piston shaft and the shift rod is formed on the inner circumference of the piston shaft. In this variant, the actuating device according to the invention can be formed in a simpler design from the manufacturing viewpoint such that the piston shaft ends at a collar of the shift rod in the interior of the gear housing, wherein the piston shaft is provided on its end face facing towards the collar of the shift rod with at least one opening which hydraulically connects the channel between the piston shaft and the shift rod to the interior of the gear housing.

In another variant of the actuating device according to the invention, in which the actuating device has a pressure medium supply that is separate from the lubricant and coolant circuit, the auxiliary chamber may be permanently hydraulically connected to one of the two working chambers via a connecting channel, wherein this working chamber is in turn permanently hydraulically connected to the reservoir via a restrictor. If, in this variant, the working chamber which is acted upon by pressure medium is the one which is not connected to the auxiliary chamber via the connecting channel, the pressure medium entraining any air inclusions from this working chamber passes across the valve-like sealing arrangement into the auxiliary chamber and from there via the connecting channel into the other working chamber. If the latter working chamber is subsequently acted upon by pressure medium, the same pressure thus prevails in this working chamber and in the auxiliary chamber on account of the permanent connection brought about by the connecting channel between this working chamber and the auxiliary chamber, which is why there is no flow of pressure medium across the valve-like sealing arrangement between this working chamber and the auxiliary chamber. Rather, a deliberate leakage of the pressure medium then takes place from this working chamber via the additional restrictor and into the reservoir, which leakage further conveys the air inclusions in the pressure medium from this working chamber into the reservoir for the pressure medium. In this other variant of the actuating device according to the invention, the connecting channel advantageously runs essentially axially in the shift piston, wherein the connecting channel opens at one end into the associated working chamber while the connecting channel at its other end is hydraulically connected via the aforementioned throttle point to the essentially radially running channel in the shift piston. In principle, the working chamber closest to the interior of the gear housing may be connected to the auxiliary chamber via the connecting channel. However, with regard to simple fitting or installation of the restrictor, it is preferred if said working chamber, i.e. the working chamber that is permanently connected to the auxiliary chamber via the connecting channel, is the working chamber which is on the side of the shift piston facing away from the interior of the gear housing.

The cylinder chamber for accommodating the shift piston actively connected to the shift rod may in principle be formed by the gear housing itself, or by a cylinder housing which is flanged onto the gear housing. However, with regard to simple and cost-effective manufacture and a small space requirement, preference is given to an embodiment of the actuating device according to the invention in which the cylinder chamber is formed by an insert which is inserted in a stepped bore in the gear housing and is fixed in the latter by means of a cover attached to the gear housing. In this case, the insert may advantageously be essentially beaker-shaped, with a bottom which has a central opening for the passage of the shift rod and delimits an annular channel with a step of the stepped bore in the gear housing, which annular channel communicates with a control connection for the working chamber closest to the interior of the gear housing, wherein the bottom of the insert is provided with a plurality of holes distributed over the circumference, which holes connect the working chamber closest to the interior of the gear housing to the annular channel, which in a simple manner ensures a large connection cross section between the control connection and this working chamber and moreover provides an angularly non-directional installation of the insert in the stepped bore of the gear housing. Advantageously, the insert may also serve to guide a hollow piston shaft of the shift piston which surrounds the shift rod.

Finally, with regard to cost-effective manufacture without the need for post-machining, it is preferred if the insert and/or the shift piston is injection-molded from a plastic. With regard to good abrasion resistance, polyphthalamide (PPA) with a predetermined glass fiber content, for example PPA with a 50% glass fiber content, has proven to be advantageous as a material for the insert and/or the shift piston.

BRIEF DESCRIPTION OF THE DRAWINGS

The invention will be explained in more detail below on the basis of preferred examples of embodiments and with reference to the appended, partially schematic drawings, wherein identical or corresponding parts are provided with the same references. In the drawings.

Figure 1:
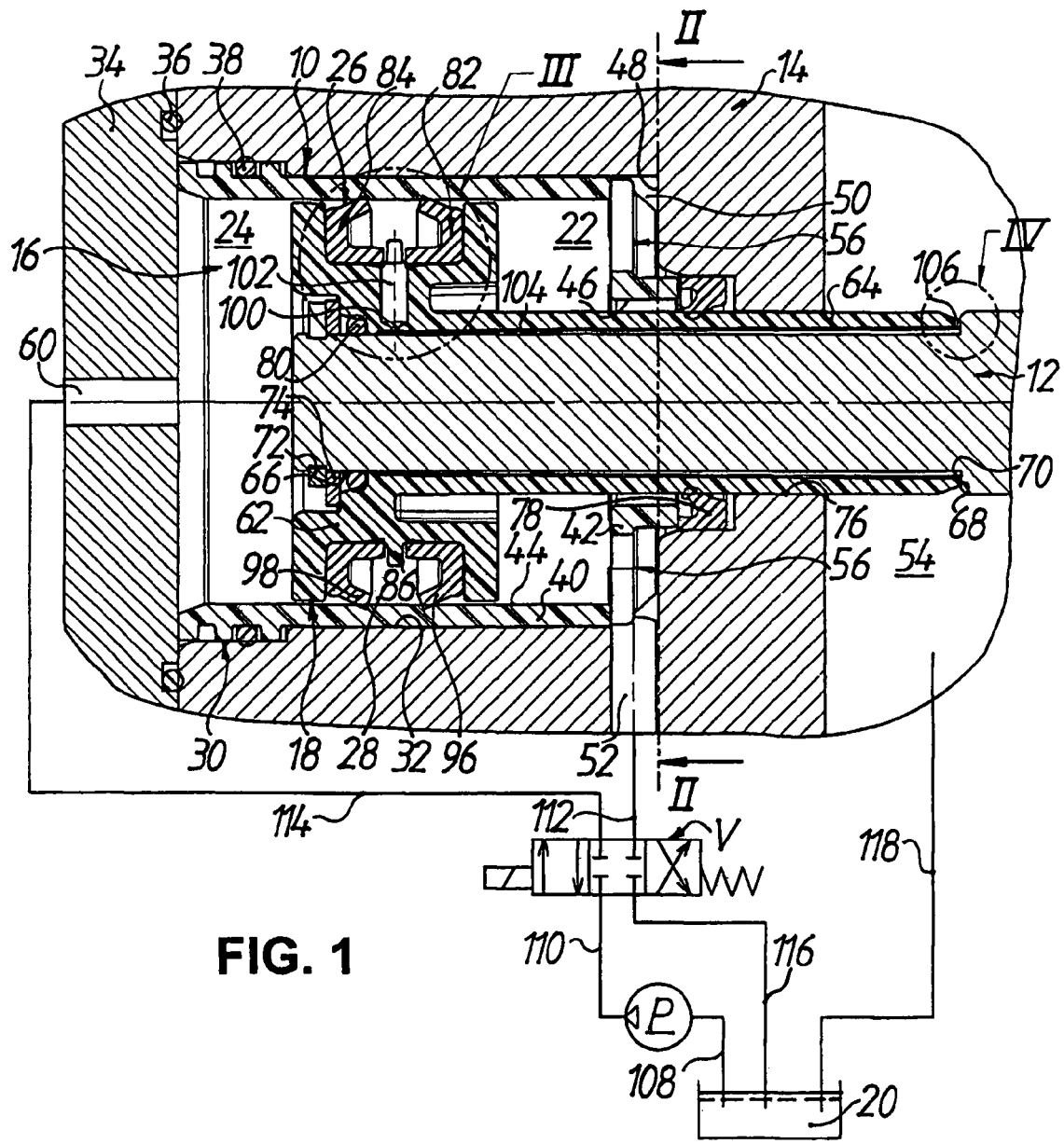
FIG. 1 shows, on an enlarged scale compared to the actual dimensions, a fragmentary longitudinal sectional view of a hydraulic actuating device according to the invention according to a first example of embodiment in a gearbox for motor vehicles, the pressure medium supply of which is connected to the lubricant and coolant circuit of the gear mechanism.

In the drawings, elastic or elastomeric components, namely the static and dynamic seals, are shown in the non-deformed state in order to simplify the diagram; in actual fact, these deformable components bear against the adjacent surfaces of adjoining components. Furthermore, the drawings show the actuating device according to the first and second example of embodiment in a (rest) state in which they are not acted upon by a pressure medium.

DETAILED DESCRIPTION OF THE EXAMPLES OF EMBODIMENTS

FIG. 1 shows a hydraulic actuating device 10 for actuating, i.e. axially displacing, a shift rod 12 in a gearbox for motor vehicles, the gear housing of which is denoted 14 in the figures. Provided in the gear housing 14 is a cylinder chamber 16 for accommodating a shift piston 18 actively connected to the shift rod 12. The shift piston 18 divides the cylinder chamber 16 into two working chambers 22, 24 which can selectively be acted upon by a pressure medium, in the present case a hydraulic oil, from a reservoir 20 (shown only schematically) for the pressure medium, which working chambers are separated from one another by means of a sealing arrangement 26 arranged on the shift piston 18. As will be explained in more detail below, it is essential that the sealing arrangement 26 is designed in a valve-like manner so that, when at least one working chamber 22, 24 is acted upon by pressure medium, it connects said working chamber to an auxiliary chamber 28 which is delimited by the sealing arrangement 26 and which in turn can be connected to the reservoir 20 for the pressure medium in order to ensure continuous (forced) venting of the working chambers 22, 24 via the auxiliary chamber 28 to the reservoir 20.

In the illustrated example of embodiment, the cylinder chamber 16 is formed by an insert 30 which is inserted in a stepped bore 32 in the gear housing 14 and is fixed in the latter by means of a cover 34 attached to the gear housing 14 in a manner not shown in any greater detail. Here, the cylinder chamber 16 is statically sealed with respect to the environment by means of an O-ring 36 which is arranged between the cover 34 and the gear housing 14 in an annular groove on the cover 34. An O-ring 38 arranged in a radial groove on the outer circumference of the insert 30 statically seals the insert 30 with respect to the stepped bore 32 in the gear housing 14 in order to separate from one another at this point in a hydraulically sealed manner the working chambers 22, 24 formed in the insert 30.

The insert 30, which is preferably produced by injection molding from a plastic such as polyphthalamide (PPA) with a predetermined glass fiber content, e.g. 50%, is essentially beaker-shaped, with a cylindrical section 40 and a bottom 42 which adjoins the latter to the right thereof in FIG. 1. The cylindrical section 40 of the insert 30 forms with its inner circumference a cylinder wall 44 as a running surface for the sealing arrangement 26 on the shift piston 18. The bottom 42 of the insert 30 has a central opening 46 for the passage of the shift rod 12 and together with a step 48 of the stepped bore 32 in the gear housing 14 delimits an annular channel 50. The latter communicates with a control connection 52 (shown schematically in FIG. 1) for the working chamber 22 closest to the interior 54 of the gear housing 14. The bottom 42 of the insert 30 is furthermore provided with a plurality of holes 56 distributed at uniform angular spacings over the circumference, which holes are separated from one another by webs 58 and permanently connect the working chamber 22 closest to the interior 54 of the gear housing 14 to the annular channel 50 (for the sake of clarity, not all the holes 56 and webs 58 on the bottom 42 of the insert 30 are provided with references in the figures). Accordingly, the right-hand working chamber 22 of the actuating device 10 in FIG. 1 can be acted upon by the pressure medium via the control connection 52, the annular channel 50 and the holes 56 in the bottom 42 of the insert 30. In order for the left-hand working chamber 24 of the actuating device 10 in FIG. 1 to be acted upon by pressure medium, the cover 34 is provided with a central control connection 60 (likewise shown only schematically).

In FIG. 1, the shift piston 18 is a shaft-type piston which is preferably likewise produced by injection molding from a plastic such as polyphthalamide (PPA) with a predetermined glass fiber content, e.g. 50%, comprising a piston part 62 and a hollow piston shaft 64. The piston shaft 64 is pushed onto a shoulder 66 of the shift rod 12 and secured on the latter in the axial direction, wherein the piston shaft 64 in FIG. 1 bears with its end face 68 to the right against a collar 70 of the shift rod 12 while the shift piston 18 in FIG. 1 is held essentially without any play to the left by means of a slotted securing ring 72, which engages in a radial groove provided on the shoulder 66 of the shift rod 12, and a washer 74. The piston shaft 64 together with the shift rod 12 extends through an opening 76 in the gear housing 14 into the interior 54 of the gear housing 14. Here, the piston shaft 64 surrounding the shift rod 12 is dynamically sealed on its outer circumference by means of a sealing element 78 which is accommodated in the section of the stepped bore 32 in the gear housing 12 which is adjacent to the opening 76 and is held there by the bottom 42 of the insert 30. Finally, adjacent to the washer 74, an O-ring 80 is accommodated in a cutout of the shift piston 18 in order to provide static sealing between the inner circumferential surface of the piston shaft 64 and the outer circumferential surface of the shoulder 66 of the shift rod 12 and thus at this point between the working chamber 24 and the interior 54 of the gear housing 14.

Figure 3:
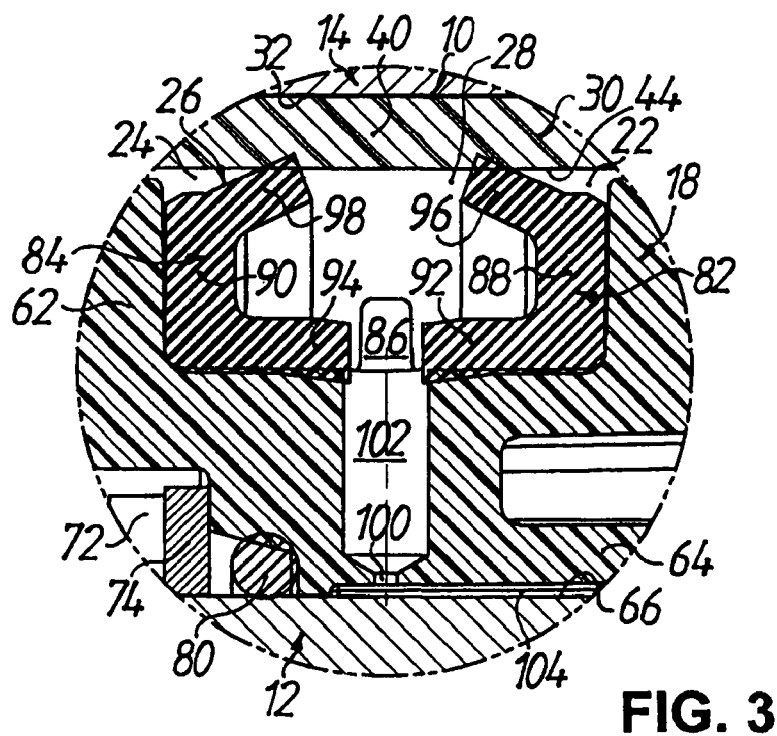
FIG. 3 shows an enlarged view of detail III in FIG. 1.

As shown in FIGS. 1 and 3, the piston part 62 has on its outer circumference a diameter which is somewhat smaller than the inner diameter of the cylinder wall 44 of the insert 30, and is provided with an annular cutout there essentially in the center as seen in the axial direction, which annular cutout on the one hand serves to accommodate the sealing arrangement 26 on the shift piston 18 and on the other hand forms the annular auxiliary chamber 28. As shown in particular in FIG. 3, the sealing arrangement 26 comprises two seals 82, 84 which are in each case arranged between one of the working chambers 22, 24 and the auxiliary chamber 28 and are separated from one another by means of a radial web 86 formed on the piston part 62.

The seals 82, 84 are elastic or elastomeric groove rings known per se which, as shown in particular in FIG. 3, are mounted on the shift piston 18 in the opposite way to their customary installed position, in each case with a main body 88, 90 from which a radially inner static sealing lip 92 and 94 and a radially outer dynamic sealing lip 96 and 98 extend in an essentially V-shaped arrangement. In the intended installed position of the seals 82, 84, the latter can be supported via their static sealing lips 92, 94 on the radial web 86 of the piston part 62, while the dynamic sealing lips 96, 98 of the seals 82, 84 lie opposite one another to delimit the auxiliary chamber 28. As a result of this arrangement of the seals 82, 84 and the fact that, as already mentioned above and as will be described in more detail below, the auxiliary chamber 28 has an exit for the pressure medium which ultimately leads to the reservoir 20, a valve-like function of the sealing arrangement 26 is obtained: In the rest state of the actuating device 10 as shown in the figures, the dynamic sealing lips 96, 98 of the seals 82, 84 bear against the cylinder wall 44 of the cylinder chamber 16 with a certain prestress. If, when a working chamber 22 or 24 is acted upon by pressure medium, the hydraulic pressure in said working chamber exceeds the hydraulic pressure in the auxiliary chamber 28 by a predetermined amount, the dynamic sealing lip 96 or 98 adjoining the working chamber 22 or 24 that is acted upon by pressure medium is flexed away from the cylinder wall 44 and clears a passage for the pressure medium. If, on the other hand, the hydraulic pressure in the auxiliary chamber 28 exceeds the hydraulic pressure in an adjoining working chamber 22 or 24 by a predetermined amount, which is the case for example when the working chamber 22 is acted upon by pressure medium while the working chamber 24 is not acted upon by pressure medium, the dynamic sealing lip 98 or 96 adjoining the working chamber 24 or 22 that is not acted upon by pressure medium is pressed against the cylinder wall 44 in order to provide sealing with respect to the cylinder wall 44.

As can furthermore be seen from FIGS. 1 and 3, the hydraulic connection between the auxiliary chamber 28 and the reservoir 20 has (at least) one throttle point 100. More specifically, the piston part 62 of the shift piston 18 has (at least) one essentially radially running channel 102 which passes through the radial web 86 and has two ends, of which one end, i.e. the radially outer end, opens into the auxiliary chamber 28 while the throttle point 100 is provided at the other end, i.e. the radially inner end.

Figure 2:
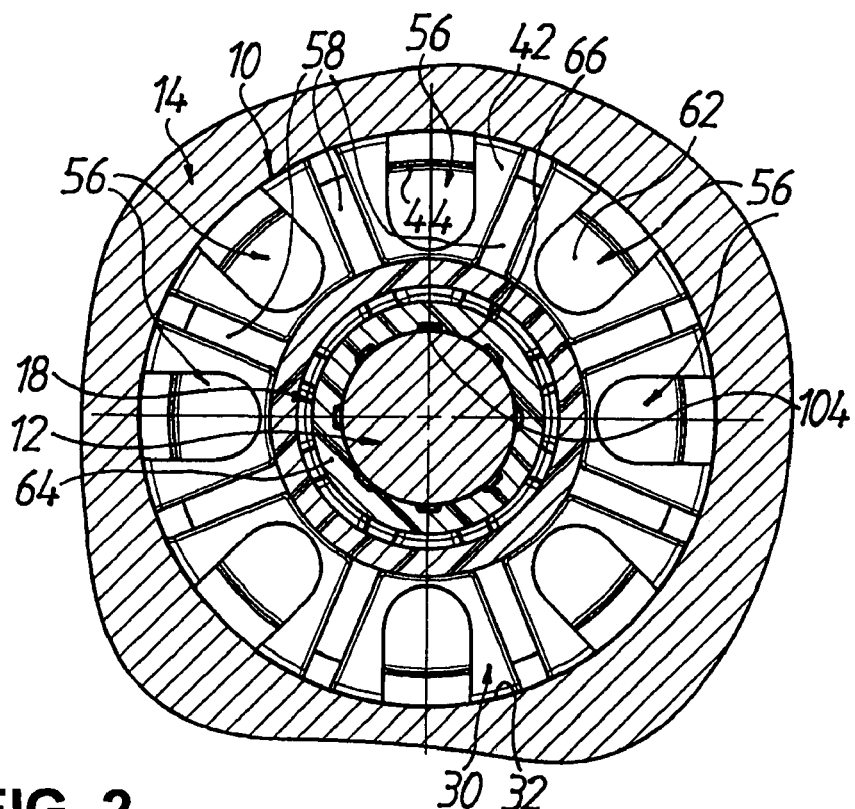
FIG. 2 shows a fragmentary sectional view of the actuating device according to the first example of embodiment along the section line II-II in FIG. 1.
Figure 4:
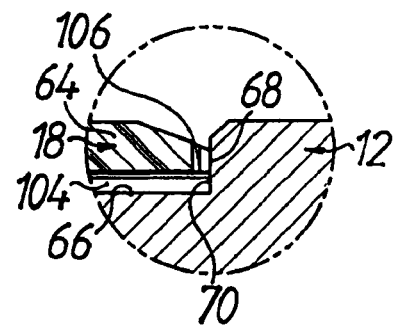
FIG. 4 shows an enlarged view of detail IV in FIG. 1.

As can furthermore be seen from FIGS. 1, 2 and 3, (at least) one channel 104 running in the longitudinal direction is formed between the piston shaft 64 and the shoulder 66 of the shift rod 12 and hydraulically connects the auxiliary chamber 28 to the interior 54 of the gear housing 14. More specifically, the channel 104 between the piston shaft 64 and the shift rod 12 is formed on the inner circumference of the piston shaft 64 and is connected at its left-hand end in FIG. 1 to the throttle point 100, while at its right-hand end in FIG. 1 it ends at the collar 70 of the shift rod 12 in the interior 54 of the gear housing 14. As shown in FIGS. 1 and 4, the piston shaft 64 is provided there at its end 68 facing towards the collar 70 of the shift rod 12 with (at least) one opening 106 which ultimately hydraulically connects the channel 104 to the interior 54 of the gear housing 14.

The above-described actuating device 10 is supplied with the pressure medium as follows, starting from the reservoir 20. The input side of a hydraulic pump P is connected to the reservoir 20 via an intake line 108. The output side of the hydraulic pump P is connected via a pressure line 110 to the pressure connection of an electromagnetically operated 4/2-way valve V which is biased by a spring into its closed position shown in FIG. 1. The top two working connections of the 4/2-way valve V as shown in FIG. 1 are respectively connected via associated hydraulic lines 112 and 114 to the control connection 52 for the right-hand working chamber 22 in FIG. 1 and to the control connection 60 for the left-hand working chamber 24 in FIG. 1. The return connection of the 4/2-way valve V is connected to the reservoir 20 via a return line 116. Finally, in FIG. 1 a hydraulic line 118 between the interior 54 of the gear housing 14 and the reservoir 20 indicates that the actuating device 10 is connected to the lubricant and coolant circuit of the gear mechanism and is supplied with the pressure medium from the oil sump of the gear mechanism.

The actuating device 10 designed as described above and connected to a pressure medium supply operates as follows.

If the shift rod 12 is to be moved to the left in FIG. 1 for a shift operation in the gearbox, the 4/2-way valve V is actuated via a control unit (CPU) (not shown in the figures) in such a way that the pressure line 110 communicates hydraulically with the hydraulic line 112 while the hydraulic line 114 is hydraulically connected to the return line 116 (right-hand switching position of the 4/2-way valve in FIG. 1). The pressure medium is then pumped from the reservoir 20 or the oil sump of the gear mechanism by the hydraulic pump P via the intake line 108, the pressure line 110 and the hydraulic line 112 to the control connection 52. From there, the pressure medium passes via the annular channel 50 and the holes 56 in the bottom 42 of the insert 30 into the working chamber 22. As a result of the hydraulic pressure which builds up in the working chamber 22 and which acts on the right-hand end face of the piston part 62 of the shift piston 18 in FIG. 1, the shift piston 18 and thus the shift rod 12 fixedly connected to the shift piston 18 moves to the left in FIG. 1. At the same time, the non-pressurised pressure medium in the working chamber 24 is pushed out of the working chamber 24 by the shift rod 12 and the shift piston 18, or more precisely the left-hand end faces of the shift rod 12 and shift piston 18 in FIG. 1, via the control connection 60, and thereafter the displaced pressure medium passes via the hydraulic line 114, the 4/2-way valve V and the return line 116 into the reservoir 20.

During this process, as soon as the hydraulic pressure in the working chamber 22 exceeds the hydraulic pressure in the auxiliary chamber 28 by a predetermined amount, the dynamic sealing lip 96 of the right-hand seal 82 of the sealing arrangement 26 in FIGS. 1 and 3 lifts off of cylinder wall 44 radially inward and clears an ideally annular passage for the pressure medium between it and the cylinder wall 44 of the cylinder chamber 16, via which passage a relatively small amount of the pressure medium flows out of the working chamber 22 and into the auxiliary chamber, together with any air inclusions in the pressure medium which have been transported by the flow of pressure medium to the cylinder wall 44 and have risen there. As a result, a hydraulic pressure builds up in the auxiliary chamber 28, which presses the dynamic sealing lip 98 of the left-hand seal 84 of the sealing arrangement 26 in FIGS. 1 and 3 with respect to the non-pressurised working chamber 24 against the cylinder wall 44 of the cylinder chamber 24 in a sealing manner. The pressure medium with the air inclusions therein is then conveyed from the auxiliary chamber 28 via the radially running channel 102, the throttle point 100 at the end thereof, the axially running channel 104 between the shift rod 12 and the piston shaft 64 of the shift piston 18 and also the opening 106 on the end face 68 of the piston shaft 64 (cf. FIG. 4) into the interior 54 of the gear housing 14 and thus the reservoir 20 for the pressure medium, which is suitably vented to the environment in a manner known per se.

The throttle point 100 here is dimensioned in such a way that on the one hand no excessive leakage or no excessive leakage volume flow takes place through the auxiliary chamber 28 (design tendency: small throttle cross section) but on the other hand the flow rate of the pressure medium is high enough to entrain the air inclusions in the pressure medium with the flow, and the hydraulic pressure set dynamically in the auxiliary chamber 28 does not become too high, which would possibly excessively increase the force required in order to displace the shift rod 18 due to stronger pressing of the dynamic sealing lip of the seal of the sealing arrangement 26 against the cylinder wall 44 of the cylinder chamber 16, the seal in question being the one arranged between the auxiliary chamber 28 and the working chamber that is not acted upon by pressure medium. Moreover, the throttle cross section of the throttle point 100 is adapted to the minimum opening pressure of the dynamic sealing lips 96, 98 of the seals 82 and 84 (e.g. 0.2 bar) in such a way that a certain "vacuum effect" is produced in the auxiliary chamber 28, which in the idle sate of the actuating device 10, even during relatively long periods of non-actuation thereof, prevents the auxiliary chamber 28 from "running out" to the reservoir 20.

If, on the other hand, the shift rod 12 is to be moved to the right in FIG. 1 for a shift operation in the gearbox, the 4/2-way valve V is actuated in such a way that the pressure line 110 communicates hydraulically with the hydraulic line 114 while the hydraulic line 112 is hydraulically connected to the return line 116 (left-hand switching position of the 4/2-way valve in FIG. 1). The pressure medium is then pumped from the reservoir 20 by the hydraulic pump P via the intake line 108, the pressure line 110 and the hydraulic line 114 to the control connection 60 and thus into the left-hand working chamber 24 of the actuating device 10 in FIG. 1. As a result of the hydraulic pressure which now builds up in the working chamber 24 and which acts on the left-hand end faces of the shift rod 12 and piston part 62, the shift piston 18 and thus the shift rod 12 moves to the right in FIG. 1. At the same time, the non-pressurised pressure medium in the working chamber 22 is pushed into the reservoir 20 by the shift piston 18, or more precisely the right-hand end face of the piston part 62 in FIG. 1, via the holes 56 in the insert 30, the annular channel 50, the control connection 52, the hydraulic line 112, the 4/2-way valve V and the return line 116.

During this process, as soon as the hydraulic pressure in the working chamber 24 exceeds the hydraulic pressure in the auxiliary chamber 28 by a predetermined amount, the dynamic sealing lip 98 of the left-hand seal 84 of the sealing arrangement 26 in FIGS. 1 and 3 lifts off of cylinder wall 44 radially inward and clears a likewise ideally annular passage for the pressure medium between it and the cylinder wall 44 of the cylinder chamber 16, via which passage a relatively small amount of the pressure medium again flows out of the working chamber 24 and into the auxiliary chamber 28, together with any air inclusions in the pressure medium which have been transported by the flow of pressure medium to the cylinder wall 44 and have risen there. As a result, a hydraulic pressure again builds up in the auxiliary chamber 28, which presses the dynamic sealing lip 96 of the right-hand seal 82 of the sealing arrangement 26 in FIGS. 1 and 3 with respect to the non-pressurised working chamber 22 against the cylinder wall 44 of the cylinder chamber 16 in a sealing manner. The pressure medium then passes from the auxiliary chamber 28 into the reservoir 20 in the manner already described above.

It can be seen that the working chambers 22, 24 are purged and thus vented in a conceivably simple manner via the auxiliary chamber 28 to the reservoir 20 when the actuating device 10 is actuated.

Figure 5:
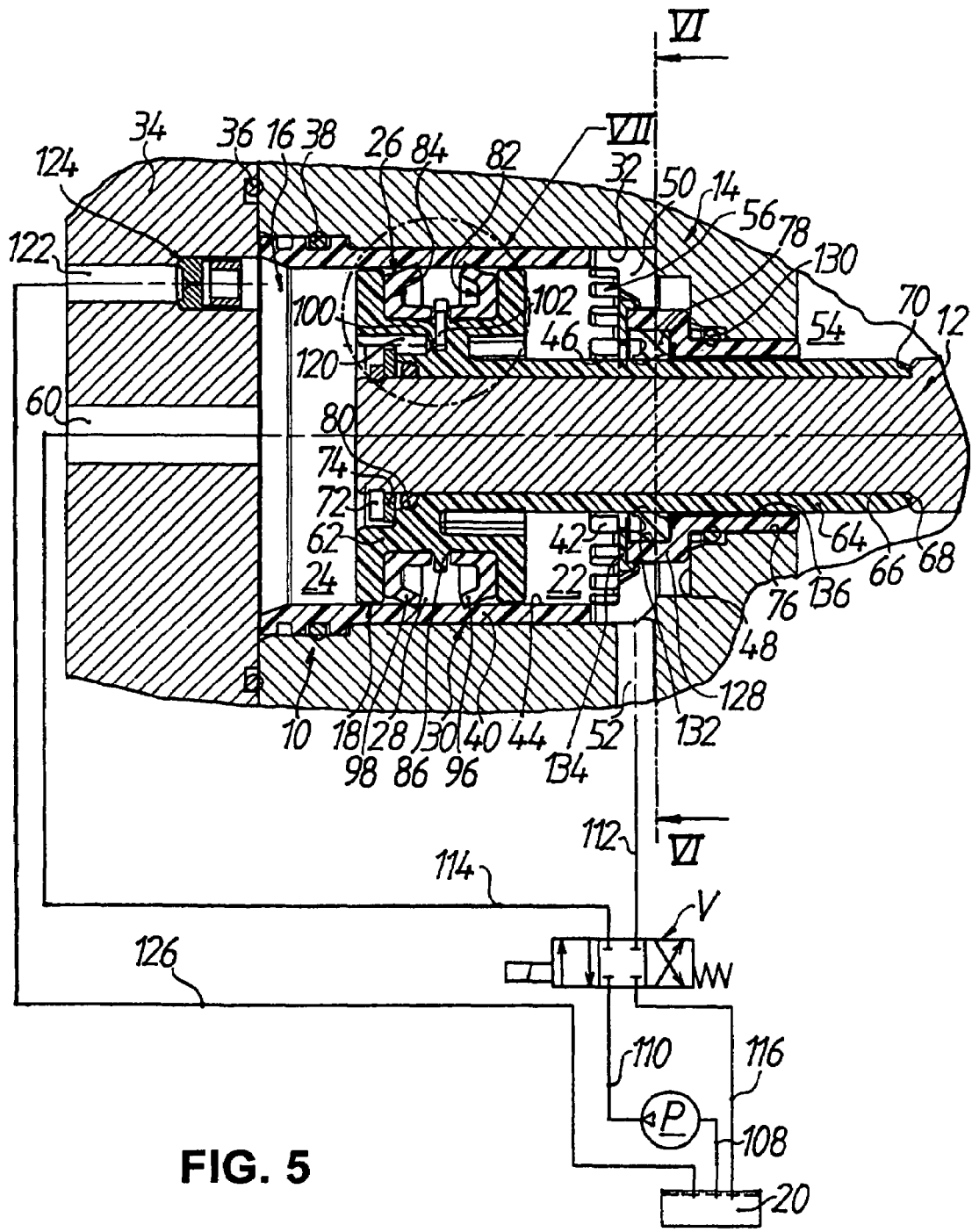
FIG. 5 shows, on an enlarged scale compared to the actual dimensions, a fragmentary longitudinal sectional view of a hydraulic actuating device according to the invention according to a second example of embodiment in a gearbox for motor vehicles, the pressure medium supply of which is connected not to the lubricant and coolant circuit of the gear mechanism but rather to a circuit separate therefrom.
Figure 6:
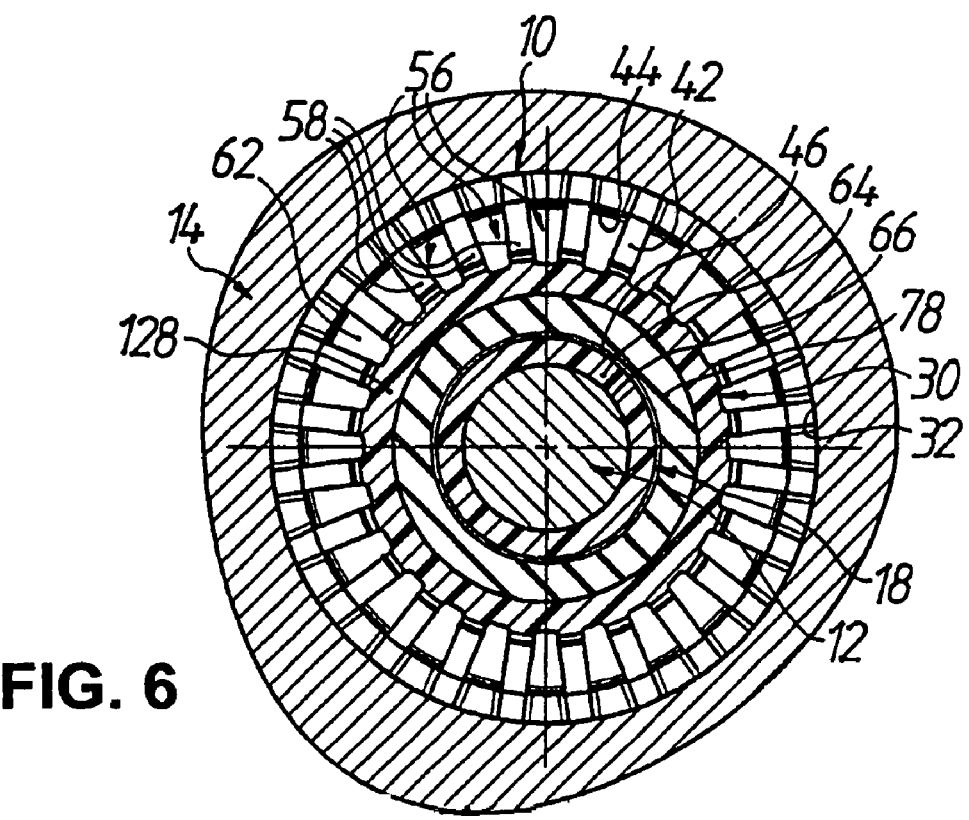
FIG. 6 shows a fragmentary sectional view of the actuating device according to the second example of embodiment along the section line VI-VI in FIG. 5.
Figure 7:
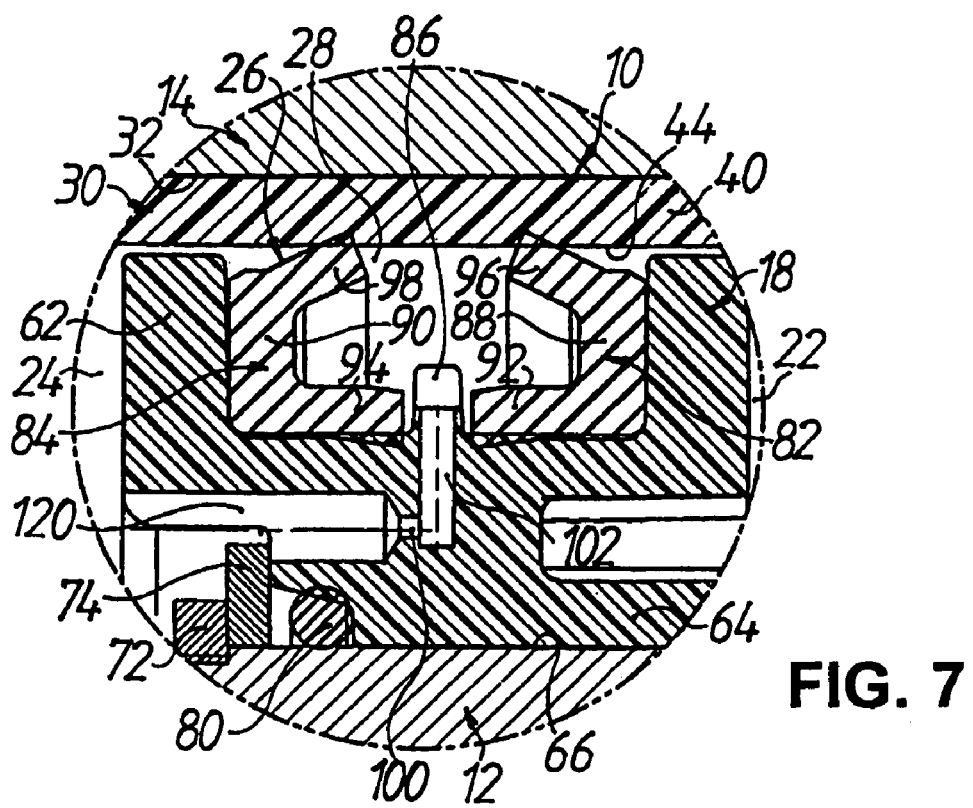
FIG. 7 shows an enlarged view of detail VII in FIG. 5.

FIGS. 5 to 7 show a hydraulic actuating device 10 according to a second example of embodiment, which will be described below only to the extent that it differs from the first example of embodiment described with reference to FIGS. 1 to 4. Unlike in the first example of embodiment, in the second example of embodiment the actuating device 10 is supplied with the pressure medium by a circuit that is separate from the lubricant and coolant circuit of the gear mechanism, and therefore has a somewhat different structure.

In the second example of embodiment, the auxiliary chamber 28 is permanently hydraulically connected via a connecting channel 120 to one of the working chambers 22, 24, namely in the example shown the working chamber 24 which is located on the side of the shift piston 18 facing away from the interior 54 of the gear housing 14. More specifically, the connecting channel 120 runs essentially axially in the shift piston 18, wherein the connecting channel 120 opens with its left-hand end in FIGS. 5 and 7 into the associated working chamber 24 while the connecting channel 120 at its other end, the right-hand end in FIGS. 5 and 7, is hydraulically connected via the throttle point 100 to the essentially radially running channel 102 in the shift piston 18. Moreover, the cover 34 is provided in an upper region of the working chamber 24 with a further connection 122, in which there is inserted a restrictor, e.g. in the form of a commercially available press-in restrictor 124, which in order to minimise the flow losses has only a small restrictor cross section (for example 0.6 mm). Finally, the connection 122 is permanently hydraulically connected via a further hydraulic line 126 to the reservoir 20. Accordingly, in the second example of embodiment, no connection is provided between the auxiliary chamber 28 and the interior 54 of the gear housing 14.

If the shift rod 12 in FIG. 5 is to be moved to the left, the working chamber 22 is acted upon by the pressure medium via the control connection 52 as already described above. As a result, the dynamic sealing lip 96 of the seal 82 lifts off wall 44 radially inward or is flexed away in this direction, while the pressure medium flowing into the auxiliary chamber 28 presses the dynamic sealing lip 98 of the seal 84 against the cylinder wall 44 of the cylinder chamber 16, as in the first example of embodiment. However, the pressure medium with any air inclusions contained therein then passes from the auxiliary chamber 28 via the channel 102, the throttle point 100 and the connecting channel 120 into the working chamber 24, in which the air inclusions rise upwards. At the same time, pressure medium is pushed out of the working chamber 24 and towards the reservoir 20 via the control connection 60 by the shift piston 18 moving towards the left in FIG. 5, in the manner described above.

If the working chamber 24 is then acted upon by pressure medium via the control connection 60, in order to displace the shift rod 12 to the right in FIG. 5, the pressure medium passes via the connecting channel 120, the throttle point 100 and the channel 102 into the auxiliary chamber 28. In the process, a pressure equilibrium is reached between the working chamber 24 and the auxiliary chamber 28, as a result of which the same pressure prevails on both sides of the dynamic sealing lip 98 of the left-hand seal 84 in FIGS. 5 and 7 and therefore said sealing lip does not lift off as in the first example of embodiment, while the dynamic sealing lip 96 of the right-hand seal 82 in FIGS. 5 and 7 is pressed against the cylinder wall 44 of the cylinder chamber 16. A flow is thus created from the control connection 60 through the working chamber 24 to the press-in restrictor 124 in the connection 122, which flow entrains any air inclusions in the working chamber 24 and finally transports them via the hydraulic line 126 to the reservoir 20.

Finally, FIG. 5 shows that the hollow piston shaft 64 of the shift piston 18 which surrounds the shift rod 12 can be guided on the insert 30 instead of on the gear housing 14 as in the first example of embodiment. To this end, the insert 30 has an extension 128 which is formed in one piece with the insert 30 and extends to the right in FIG. 5 from the bottom 42 of said insert, said extension passing through the opening 76 of the gear housing 14 to the interior 54 thereof, wherein the extension 128 is statically sealed on its outer circumference with respect to the opening 76 by means of an O-ring 130. On its inner circumference, the extension 128 firstly has a shoulder 132 for accommodating the dynamic sealing element 78, which is held there by means of a washer 134 which is attached to the bottom 42 of the insert 30 in a suitable manner, for example by means of an adhesive. Finally, to the right of the shoulder 132 in FIG. 5, the extension 128 is lined on the inner circumference side with a collar bushing 136 which is preferably made from polyether ether ketone (PEEK) in order to optimise the friction pairing with the piston shaft 64 of the shift piston 18 which is guided in the collar bushing 136, and hence with regard to good sliding properties. Such a guidance of the piston shaft 64 on the insert 30 can in principle also be provided in the first example of embodiment.

In summary, there is disclosed a hydraulic actuating device for actuating a shift rod in particular of a gearbox for motor vehicles, which comprises a cylinder chamber provided in or on a gear housing for accommodating a shift piston which is actively connected to the shift rod and which divides the cylinder chamber into two working chambers which can selectively be acted upon by a pressure medium from a reservoir for the latter, said working chambers being separated from one another by means of a sealing arrangement arranged on the shift piston. According to the invention, the sealing arrangement is designed in a valve-like manner so that, when at least one working chamber is acted upon by pressure medium, it connects said working chamber to an auxiliary chamber which is delimited by the sealing arrangement and which in turn can be connected to the reservoir for the pressure medium. As a result, a cost-effective hydraulic actuating device is provided which is vented in a simple and efficient manner during operation from the working chambers via the auxiliary chamber to the reservoir.

Other variations and modifications are possible without departing from the scope and spirit of the present invention as defined by the appended claims.

We claim:

1. A hydraulic actuating device for actuating a shift rod of a gearbox for motor vehicles, comprising a cylinder chamber, provided at a location comprising one of in and on a gear housing, for accommodating a shift piston which is actively connected to the shift rod and which divides the cylinder chamber into two working chambers which are selectively pressurized by a pressure medium from a reservoir for the pressure medium, said working chambers being separated from one another by means of a sealing arrangement arranged on the shift piston; wherein the cylinder chamber is bounded by a cylinder wall that serves as a running surface for the sealing arrangement; wherein the sealing arrangement has seals and is designed in a valve-like manner so that, when at least one working chamber is pressurized by pressure medium, it connects said at least one working chamber to an auxiliary chamber which is delimited by the sealing arrangement and which in turn is connectable to the reservoir for the pressure medium; said auxiliary chamber being axially situated between the seals of the sealing arrangement, and wherein the cylinder chamber is formed by an insert which is inserted in a stepped bore in the gear housing and has a cylindrical section that forms with an inner circumference thereof the cylinder wall.

2. An actuating device according to claim 1, wherein the cylinder chamber is formed by an insert which is inserted in a stepped bore in the gear housing and is fixed in the latter by means of a cover attached to the gear housing.

3. An actuating device according to claim 2, wherein the insert is injection-molded from a plastic.

4. An actuating device according to claim 3, wherein the plastic is PPA with a predetermined glass fiber content.

5. An actuating device according to claim 1, wherein the shift piston is injection-molded from a plastic.

6. An actuating device according to claim 5, wherein the plastic is PPA with a predetermined glass fiber content.

7. A hydraulic actuating device for actuating a shift rod of a gearbox for motor vehicles, comprising a cylinder chamber, provided at a location comprising one of in and on a gear housing, for accommodating a shift piston which is actively connected to the shift rod and which divides the cylinder chamber into two working chambers which are selectively pressurized by a pressure medium from a reservoir for the pressure medium, said working chambers being separated from one another by means of a sealing arrangement arranged on the shift piston; wherein the sealing arrangement is designed in a valve-like manner so that, when at least one working chamber is pressurized by the pressure medium, it connects said at least one working chamber to an auxiliary chamber which is delimited by the sealing arrangement and which in turn is connectable to the reservoir for the pressure medium; and wherein the sealing arrangement comprises two seals which are in each case arranged between a respective one of the working chambers and the auxiliary chamber.

8. An actuating device according to claim 7, wherein the actuating device has a rest state and wherein each seal has an elastic sealing lip which in the rest state of the actuating device bears against a cylinder wall of the cylinder chamber, and is flexibly moveable away from the cylinder wall in order to clear a passage for the pressure medium when the hydraulic pressure in the respective adjoining working chamber is a predetermined amount higher than the hydraulic pressure in the auxiliary chamber, and is pressed against the cylinder wall in order to provide sealing with respect to the cylinder wall when the hydraulic pressure in the auxiliary chamber is a predetermined amount higher than the hydraulic pressure in the respective adjoining working chamber.

9. An actuating device according to claim 7, wherein the seals are groove rings which are mounted on the shift piston in the opposite way to their customary installed position.

10. A hydraulic actuating device for actuating a shift rod of a gearbox for motor vehicles, comprising a cylinder chamber, provided at a location comprising one of in and on a gear housing, for accommodating a shift piston which is actively connected to the shift rod and which divides the cylinder chamber into two working chambers which are selectively pressurized by a pressure medium from a reservoir for the pressure medium, said working chambers being separated from one another by means of a sealing arrangement arranged on the shift piston; wherein the sealing arrangement is designed in a valve-like manner so that, when at least one working chamber is pressurized by the pressure medium, it connects said at least one working chamber to an auxiliary chamber which is delimited by the sealing arrangement and which in turn is connectable to the reservoir for the pressure medium; and wherein the hydraulic connection between the auxiliary chamber and the reservoir has at least one throttle point.

11. An actuating device according to claim 10, wherein the shift piston has at least one essentially radially running channel with two ends, of which one end opens into the auxiliary chamber while the throttle point is provided at the other end.

12. An actuating device according to claim 11, wherein the auxiliary chamber is permanently hydraulically connected to one of the two working chambers via a connecting channel, and wherein this working chamber is in turn permanently hydraulically connected to the reservoir via a restrictor, and wherein the connecting channel runs essentially axially in the shift piston, wherein the connecting channel opens at one end into the associated working chamber while the connecting channel at its other end is hydraulically connected via the throttle point to the essentially radially running channel in the shift piston.

13. A hydraulic actuating device for actuating a shift rod of a gearbox for motor vehicles, comprising a cylinder chamber, provided at a location comprising one of in and on a gear housing, for accommodating a shift piston which is actively connected to the shift rod and which divides the cylinder chamber into two working chambers which are selectively pressurized by a pressure medium from a reservoir for the pressure medium, said working chambers being separated from one another by means of a sealing arrangement arranged on the shift piston; wherein the sealing arrangement is designed in a valve-like manner so that, when at least one working chamber is pressurized by the pressure medium, it connects said at least one working chamber to an auxiliary chamber which is delimited by the sealing arrangement and which in turn is connectable to the reservoir for the pressure medium; and wherein the shift piston comprises a hollow piston shaft having an inner circumference and an outer circumference, the hollow piston shaft surrounding the shift rod and extending into the gear housing in a manner dynamically sealed at its outer circumference, wherein at least one channel is formed between the inner circumference of the piston shaft and the shift rod, which channel hydraulically connects the auxiliary chamber to the interior of the gear housing.

14. An actuating device according to claim 13, wherein the channel is formed between the piston shaft and the shift rod on the inner circumference of the piston shaft.

15. An actuating device according to claim 13, wherein the piston shaft ends at a collar of the shift rod in the interior of the gear housing, wherein the piston shaft has an end face facing towards the collar of the shift rod and is provided on that end face with at least one opening which hydraulically connects the channel between the piston shaft and the shift rod to the interior of the gear housing.

16. A hydraulic actuating device for actuating a shift rod of a gearbox for motor vehicles, comprising a cylinder chamber, provided at a location comprising one of in and on a gear housing, for accommodating a shift piston which is actively connected to the shift rod and which divides the cylinder chamber into two working chambers which are selectively pressurized by a pressure medium from a reservoir for the pressure medium, said working chambers being separated from one another by means of a sealing arrangement arranged on the shift piston; wherein the sealing arrangement is designed in a valve-like manner so that, when at least one working chamber is pressurized by the pressure medium, it connects said at least one working chamber to an auxiliary chamber which is delimited by the sealing arrangement and which in turn is connectable to the reservoir for the pressure medium; and wherein the auxiliary chamber is permanently hydraulically connected to one of the two working chambers via a connecting channel, and wherein this working chamber is in turn permanently hydraulically connected to the reservoir via a restrictor.

17. An actuating device according to claim 16, wherein said working chamber is the working chamber which is on a side of the shift piston facing away from the interior of the gear housing.

18. A hydraulic actuating device for actuating a shift rod of a gearbox for motor vehicles, comprising a cylinder chamber, provided at a location comprising one of in and on a gear housing, for accommodating a shift piston which is actively connected to the shift rod and which divides the cylinder chamber into two working chambers which are selectively pressurized by a pressure medium from a reservoir for the pressure medium, said working chambers being separated from one another by means of a sealing arrangement arranged on the shift piston; wherein the sealing arrangement is designed in a valve-like manner so that, when at least one working chamber is pressurized by the pressure medium, it connects said at least one working chamber to an auxiliary chamber which is delimited by the sealing arrangement and which in turn is connectable to the reservoir for the pressure medium; wherein the cylinder chamber is formed by an insert which is inserted in a stepped bore in the gear housing and is fixed in the latter by means of a cover attached to the gear housing; and wherein the insert is essentially beaker-shaped, with a bottom which has a central opening for the passage of the shift rod and delimits an annular channel with a step of the stepped bore in the gear housing, which annular channel communicates with a control connection for the working chamber closest to the interior of the gear housing, wherein the insert has a bottom which is provided with a plurality of holes distributed over the circumference, which holes connect the working chamber closest to the interior of the gear housing to the annular channel.

19. An actuating device according to claim 18, wherein a hollow piston shaft of the shift piston surrounds the shift rod and is guided on the insert.

* * * * *